March 12, 1946.  C. E. WALLING  2,396,450
V-BLOCK FIXTURE
Filed Nov. 26, 1943

INVENTOR.
CLYDE E. WALLING
BY
ATT.

UNITED STATES PATENT OFFICE 2,396,450

V-BLOCK FIXTURE

Clyde E. Walling, Cleveland, Ohio

Application November 26, 1943, Serial No. 511,881

2 Claims. (Cl. 51—216)

This invention relates in general to metal working machines and, more particularly, to work supporting fixtures for these machines and, while illustrated in connection with a tool grinding machine for grinding taps, reamers and cutters of any kind and any desired cutting edge, is not limited to this use but may readily be applied to other types of metal working machines such as general grinding machines, lathe cutting machines, etc.

In metal working, such as turning or grinding operations on shafts, tools, etc., the work piece is commonly supported between centers and when shafts or tools are long and slender, steady rests are used to avoid shatter marks in turning operations and inaccuracy in grinding operations. However, this common method of supporting a work piece between centers cannot be used for manufacturing and grinding operations on bent taps, the curved ends of which prohibit this support and necessitate the use of special supporting fixtures, the proper setting for proper alignment of the bent taps requires considerable time and skill of the operator.

It is the general object of the present invention to provide a new and practical fixture for supporting any type of work piece, either straight or partly curved, including bent taps, which fixture embodies special means to facilitate quick, simple and accurate setting of the fixture for proper support of the work piece in a metal working machine and without loss of time even by unskilled operators.

This general object of the invention is attained by providing a fixture with V-shaped adjustable supporting means and gaging means coupled with the supporting means so that gaging of a work piece effects adjustment of the supporting means, so that the axis of any work piece when gaged and thereafter supported by the supporting means intersects the fixture at the same predetermined height and location.

Another object of the invention therefore is the provision of a supporting fixture embodying a V-shaped, adjustable supporting means and gaging means coupled with the supporting means so as to automatically adjust the supporting means by gaging operations and effect alignment of any work piece when gaged and then supported in said supporting means, so that the axis of the work piece intersects the fixture at the same height and location.

A further object of the invention is the provision of a supporting fixture embodying a base, a vertically shiftably V-shaped supporting means mounted on said base and cooperating gaging means on said base and supporting means arranged with respect to each other, so that shifting during gaging operations effects vertical shifting of the supporting means for alignment of any work piece supported by said supporting means after being gaged by said gaging means, so that the axis of such a work piece intersects the fixture at the same height and location.

Proper adjustment of a fixture with vertically shiftably arranged V-shaped supporting means by gaging operations depends entirely upon the angle between the inclined arms of the V (the distance between the apex of the V and the axis of the work piece supported thereby being equal to the radius of the work piece divided by the sinus of half of the said angle;

$$h = \frac{r}{\sin a/2}$$

when $h$=the distance, $r$=radius of the work piece, and $a$=the angle between the arms of the V), and therefore the structure of the fixture can be materially simplified when the said angle is made equal to sixty degrees, so that the distance between the apex of the V and the axis of the work piece supported thereby equals the diameter of the work piece $$h = \frac{r}{\sin 30} = \frac{r}{\frac{1}{2}} = 2r$$

Still another object of the invention therefore is the provision of a supporting fixture embodying a base, a vertically adjustable supporting means with a V-shaped seat with an angle of sixty degrees and cooperating gaging members on said base and supporting means arranged above each other in parallel relation with respect to each other to effect shifting of the supporting means by gaging operations into such a position that the axis of any gaged and then in said supporting means supported work piece intersects the fixture at the same height and location.

In addition, the invention has certain other marked superiorities which radically distinguish it from presently known structures. These improvements or superior characteristics embodying certain novel features of construction are clearly set forth in the appended claims; and a preferred form of embodiment of the invention used in combination with a tool grinding machine is hereinafter shown with reference to the accompanying drawing forming part of the specification.

Figure 1:
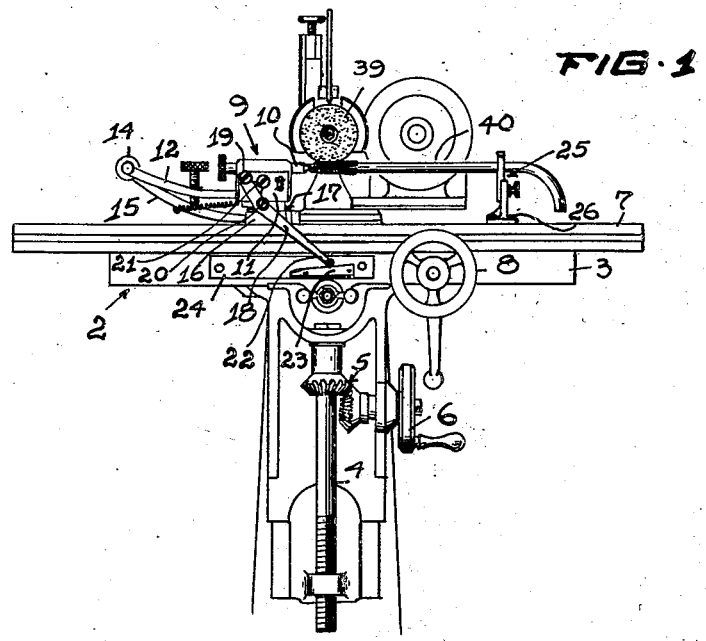
Fig. 1 is a front-view of a tool grinding machine having mounted thereon a supporting means built in accordance with the invention, the supporting means cooperating with a shiftably supported center of the grinding machine in properly holding a bent tap during grinding operations.
Figure 2:
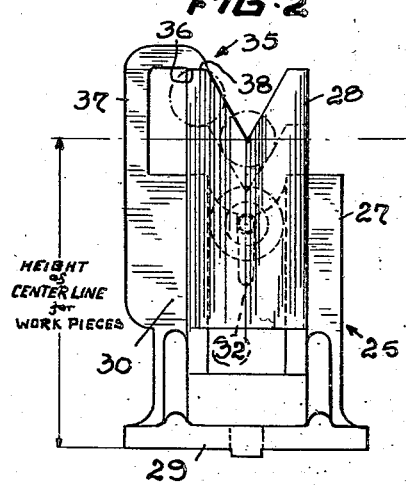
Fig. 2 is an enlarged front-view of the supporting means shown in Fig. 1, disclosing in dash-dotted lines the position of the shiftable V-shaped supporting means when adjusted for supporting a tool with a diameter as indicated.
Figure 3:
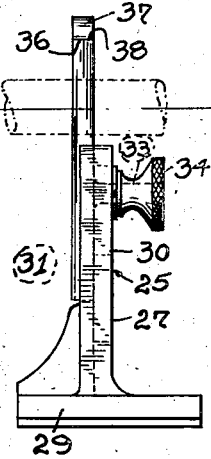
Fig. 3 is a side-view of the said supporting means.
Figure 4:
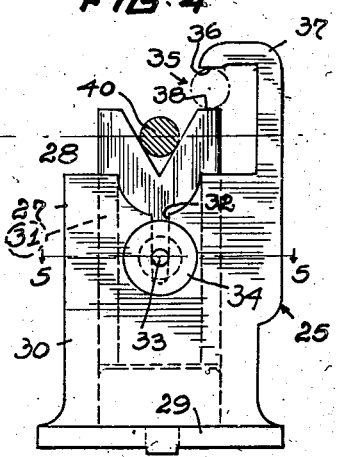
Fig. 4 is a rear-view of the said supporting means adjusted to support a tool with a smaller diameter than that of the tool shown in dash-dotted lines in Fig. 2.
Figure 5:
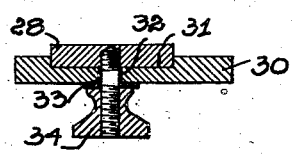
Fig. 5 is a section on line 5—5 of Fig. 4.

Referring now in detail to Fig. 1 of the drawing, tool grinding machine 2 embodies a vertically adjustably supported bed 3 which is vertically shiftably arranged by means of a threaded shaft 4 and gearing 5 operated by a hand wheel 6. Bed 3 supports a slide 7 longitudinally moved upon said bed by suitable means (not shown) which, in turn, are actuated by a hand wheel 8. This slide or sliding carriage 7 supports a center member 9 of the type described in my Patent No. 1,728,380, dated September 17, 1929, which center member embodies a center 10 supported by a block 11 on a swinging arm 12 pivoted at 14 to a fixed arm 15 of a center base 16, the latter being adjustably secured to sliding carriage 7 by bolts 17. A follower lever 18 on block 11 adjustably secured thereto by means of screws 19, 20 and 21 raises or lowers center 10 on pivot 14 when the lower end 22 of said lever 18 travels along the surface of a templet or pattern cam 23 attached to a bracket 24 secured to the bed of the grinding machine.

In addition, slide or sliding carriage 7 mounts a supporting fixture 25 adjustably attached to the slide, as customary, by bolts 26. This fixture embodies a T-shaped base member 27 and a V-block member 28 adjustably mounted on said base member. Thus, base member 27 includes a supporting base plate 29 and an upright channeled member 30, the channeled portion 31 of which is slotted at 32 to provide a slide for the V-block member, and the V-block member has extended therefrom a stud bolt 33 aligned with and extended through slot 32 in upright member 30 to clamp the V-block member in any adjusted position to upright member 30 by a knurled nut 34 threaded upon the extended end of stud bolt 33.

Adjustment of V-block member 28 in base member 27 is automatically effected when the diameter of the work piece or shank of a tool to be ground is gaged in a gaging device 35 having its one gaging face 36 formed by an inverted L-shaped portion 37 integrally extended from upright member 30 at one side thereof and its other gaging face 38 formed by a portion of the top face of V-block member 28. The two gaging faces, as shown, are arranged in planes rectangularly related to the shifting plane of the V-block member, so that the gaging device shows the movement of the V-block and the angle of the V in the V-block is sixty degrees. Consequently, any work piece or tool gaged and thereafter supported in the V of the block intersects the V at the same point, the distance between the axis of such work piece and the apex of the V being equal to the radius of the work piece times the sinus of 30°, or twice the radius of the work piece. However, when the angle of the V-block is larger or smaller than 60°, then the angular relation between the gage faces of the gaging device must be changed accordingly to automatically effect adjustment of the height of the fixture by gaging operations.

The work piece, when mounted on the tool grinding machine shown in Fig. 1, is supported by center 10 of member 9 and supporting fixture 25, the height of the latter being properly adjusted by gaging the work piece. Such mounting of a tool or work piece can be made for cylindrical or conical grinding by stationary grinding wheel 39, the work having moved back and forth with slide 7 across said wheel. The possibility of shifting center 10 of center member 9 permits up- and downward movement of the work piece to vary the position of its edge presented to the wheel, and such shifting is effected in accordance with the shape of templet or pattern 23, so that grinding of any type of special reamers, cutters and taps, including bent taps, see Fig. 1 bent tap 40, even if not supportable between centers on account of their length or shape can be effected without special settings by use of properly shaped templets or pattern cams 23.

During grinding operations of a shank tap the operator rests the tap shank in the V of the V-block and holds the centered end of said shank tap in engagement with center member 9 the head center of the tool grinding machine, while preferably, though not necessarily, keeping the teeth of the shank tap indexed against a tooth rest. In this position the shank tap is reciprocated with slide 7 so that the grinding wheel 39 gives each row of teeth the desired relief and chamfer in accordance with shape and form of templet or pattern cam 23.

Having thus described my invention what I claim is:

1. In a metal working machine a work supporting head center, and a working supporting V-block fixture arranged opposite said head center, said V-block fixture including a base member, shiftable V-block means and cooperating gage jaws on said base member and said V-block means to automatically adjust by gaging operations between said gage jaws the position of said V-block means and align work pieces of different diameters with said head center.

2. A metal grinding machine as described in claim 1, wherein the V in said V-block means is shaped to form an angle of sixty degrees, wherein said V-block means are vertically shiftably mounted in said base and wherein said gaging means have their gage jaws arranged in horizontal planes.

CLYDE E. WALLING.